H. KAPLAN.
TIRE.
APPLICATION FILED NOV. 15, 1918.

1,300,731.

Patented Apr. 15, 1919.
2 SHEETS—SHEET 1.

Inventor
H. Kaplan
By his Attorney
Sigmund Herzog

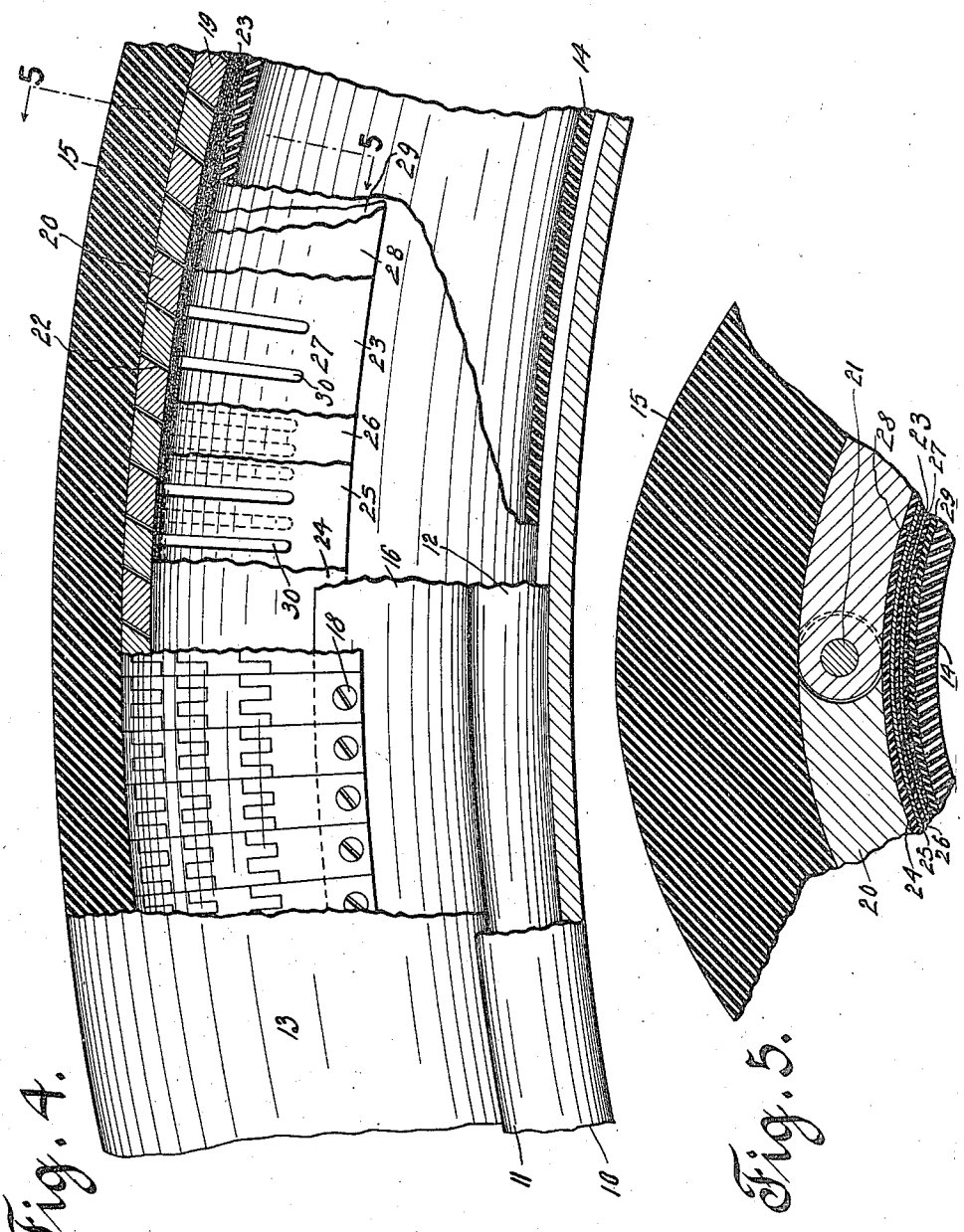

UNITED STATES PATENT OFFICE.

HYMAN KAPLAN, OF NEW YORK, N. Y.

TIRE.

1,300,731.     Specification of Letters Patent.     Patented Apr. 15, 1919.

Application filed November 15, 1918. Serial No. 262,712.

*To all whom it may concern:*

Be it known that I, HYMAN KAPLAN, a citizen of the United States, and a resident of the city of New York, in the county of New York and State of New York, have invented certain new and useful Improvements in Tires, of which the following is a specification.

The present invention relates to pneumatic tires and has for its main object to provide one which is puncture-proof.

Another object of the invention is to produce a tire of this type, which is simple in construction, efficient in operation, and is provided with clencher beads that are, so to say, everlasting.

With these and other objects in view which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
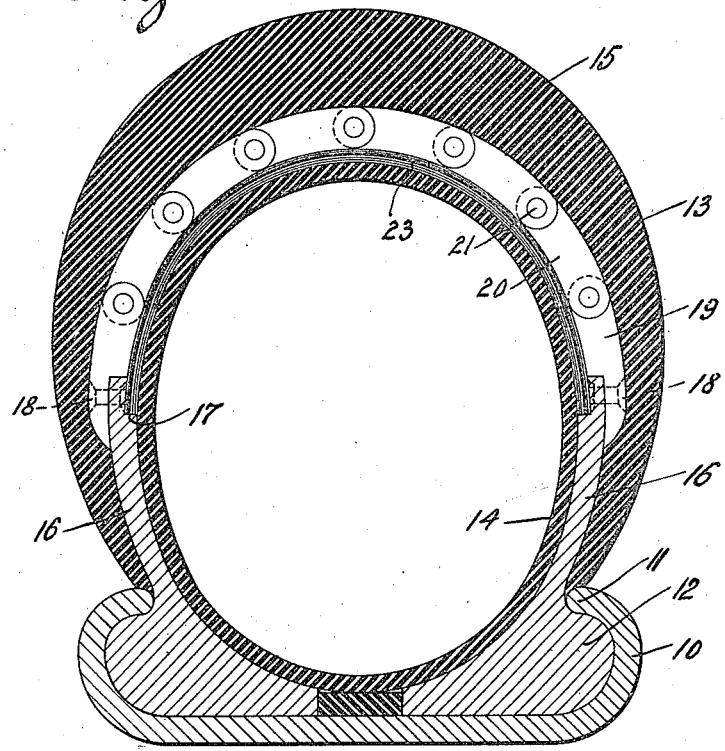
Figure 2:
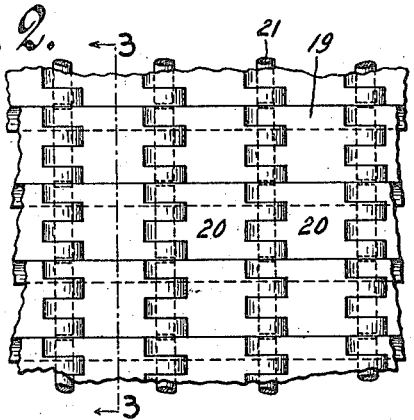
Figure 3:
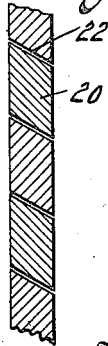

Figure 1 is a cross-section of a tire constructed in accordance with the present invention; Fig. 2 is a plan view of a portion of the armor; Fig. 3 is a section taken on line 3—3 of Fig. 2; Fig. 4 is a side elevation of the improved tire, portions being successively broken away; and Fig. 5 is a section taken on line 5—5 of Fig. 4, on a larger scale.

In the drawings, the numeral 10 indicates the rim of a vehicle wheel, provided with clencher flanges 11. With these flanges coöperate clencher beads 12 on the outer shoe 13 of the tire, an inner or air tube 14 being provided for the well-known purpose.

The shoe 13 is made of three sections, towit: a rubber section 15, constituting the tread portion of the tire, the said rubber portion being attached in any suitable manner, for instance by cementing process, to metallic ring sections 16, with which are made integral the clencher beads 12 above mentioned. These metallic sections are provided each with an interior annular shoulder 17, for a purpose hereinafter to be described. To the metallic sections 16 are attached by rivets 18, or otherwise, armor sections 19. Each of these armor sections comprises a plurality of pivotally connected links 20, which are curved transversely, as clearly appears from Figs. 1 and 5 of the drawings, to fit the curvature of the inflated inner tube 14. The outermost links of each armor section are attached by the rivets 18 to the metallic sections 16 of the tire. The pivot pins 21, connecting adjacent links of the armor sections, extend longitudinally and the transverse edges 22 of the links 20 are beveled, as clearly appears from Fig. 3 of the drawings, so that adjacent armor sections overlap to prevent sharp-pointed objects from passing through gaps which would otherwise remain between adjacent sections of the armor.

In order to prevent undue friction between the armor and the inner tube, there is inserted between these two elements a shield 23, which is annular in form and U-shaped in cross-section, abutting against the annular shoulders 17 of the metallic sections 16 of the tire. This shield consists of a plurality of layers, towit: an outer layer 24 of rubber, that is in any suitable manner attached to a metallic ring 25, the latter being united, for instance, by a rubberized tape layer 26 with a second metallic ring 27. To the inner face of this inner metallic ring is attached a rubberized tape layer 28, to which, in turn, is secured a rubber layer 29, the latter bearing against the inner tube 14 of the tire.

The metallic rings 25 and 27 are provided with transverse slots 30, whereby they are made somewhat resilient and adapted to follow closely the contour of the tire, as the same rolls along the road. The slots in the two rings are staggered, as clearly appears from Fig. 4 of the drawings, to prevent sharp pointed instruments, which may find their way through the hinge sections of the armor, from passing through the shield 23.

In assembling the parts of the tire, the armor sections are first attached to the metallic ring sections 16 of the tire, and the rubber section 15 afterward secured, in the manner hereinabove described, to the sections 16 and, if preferred, to the armor sections 19. The shield 23 is placed within the tire before the inner tube 14 is put in place. When the said tube is inflated, the said shield is prevented from shifting transversely by the annular shoulders 17, on which it rests. The tire possesses the desired flexibility, since its armor sections are composed of pivoted links, and is puncture-proof, as appears from the foregoing.

Inasmuch as the tire sections 16 and the clencher beads 12 are made of metal and since the armor sections are attached to the said metallic sections, it is obvious that, in case the rubber section 15 is worn or injured, it is necessary to replace this rubber section only, the sections 16 and its beads, and so also the armor sections, being practically everlasting, particularly if made of non-corroding metal.

What I claim is:—

1. A pneumatic tire shoe, comprising two metallic ring sections provided with clencher beads, each of said sections having an interior annular shoulder, a plurality of armor sections attached to said ring sections, each of said armor sections being composed of a plurality of pivoted links, a rubber tread section secured to said ring sections and inclosing said armor sections, and a ring-shaped shield of U-shaped cross-section abutting against the inner face of said armor sections and resting upon said shoulders.

2. A pneumatic tire shoe, comprising two metallic ring sections provided with clencher beads, each of said sections having an interior annular shoulder, a plurality of armor sections attached to said ring sections, each of said armor sections being composed of a plurality of pivoted links, a rubber tread section secured to said ring sections and inclosing said armor sections, and a ring-shaped shield of U-shaped cross-section abutting against the inner face of said armor sections and resting upon said shoulders, said shield consisting of a plurality of metallic and a plurality of non-metallic sections, each metallic section being provided with transverse slots, the slots of said metallic sections being staggered.

Signed at New York, in the county of New York, and State of New York, this 24th day of Sept., A. D. 1918.

HYMAN KAPLAN.